United States Patent [19]
Asano

[11] 3,930,264

[45] Dec. 30, 1975

[54] FILM CASSETTE

[75] Inventor: Yoshio Asano, Hyogo, Japan

[73] Assignee: Fuji Photo Film Co., Ltd., Ashigara, Japan

[22] Filed: Apr. 3, 1974

[21] Appl. No.: 457,732

[30] Foreign Application Priority Data
Apr. 12, 1973 Japan.............................. 48-44003
Apr. 3, 1973 Japan.............................. 48-38054
Apr. 18, 1973 Japan.............................. 48-43986

[52] U.S. Cl.................................. 354/174; 354/277
[51] Int. Cl.²......................................... G03B 19/10
[58] Field of Search............................ 354/174, 277

[56] References Cited
UNITED STATES PATENTS
3,595,661   7/1971   Gold .................................... 354/174
3,748,984   7/1973   Gold .................................... 354/277

*Primary Examiner*—John M. Horan
*Attorney, Agent, or Firm*—Sughrue, Rothwell, Mion, Zinn & Macpeak

[57] ABSTRACT

A film cassette is provided with a front protective board which may be slid into or out of the cassette through the monosheet exit. When inserted in the cassette, the protective board prevents entry of light through a front exposure opening formed in the cassette. When the protective board is removed from the cassette, exposed monosheets may be removed without hindrance from the cassette. If it is required to remove the cassette before exposure of all the monosheets provided therein, the protective board may be re-inserted into its original position in the cassette, and the cassette then unloaded, the remaining monosheets in the cassette being protected from exposure to light.

8 Claims, 63 Drawing Figures

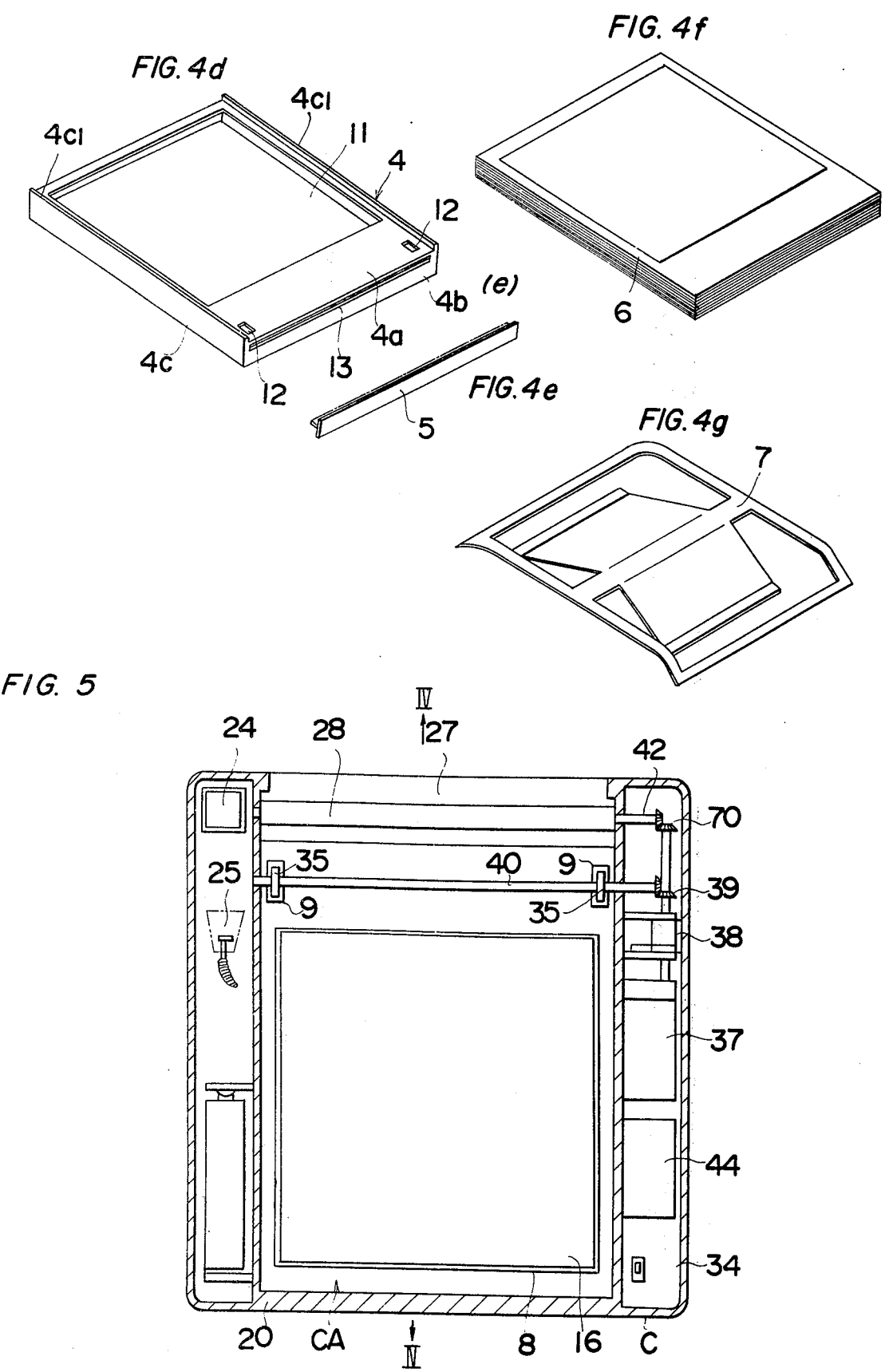

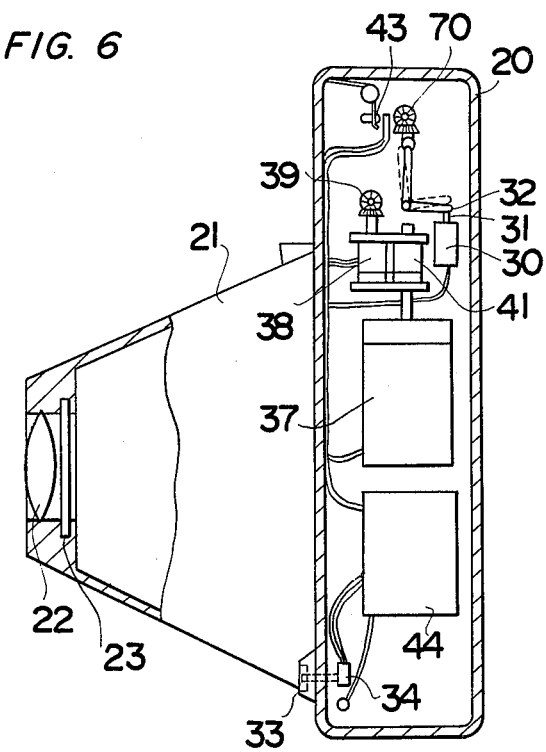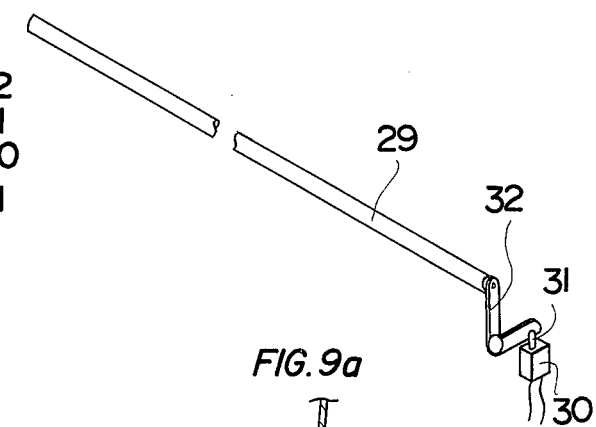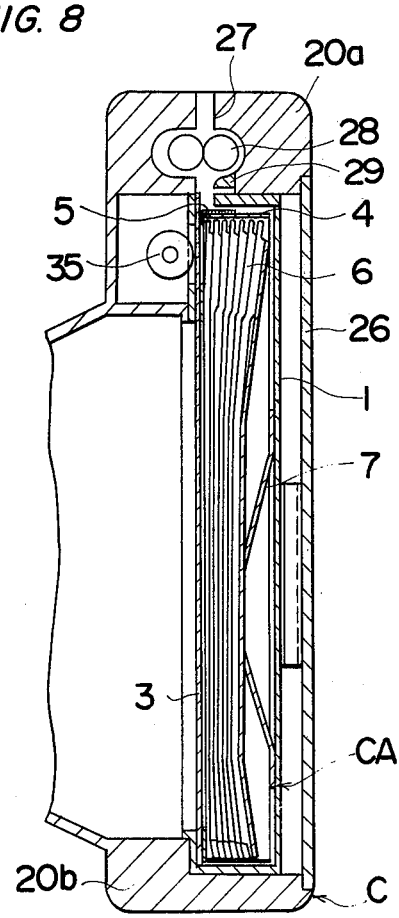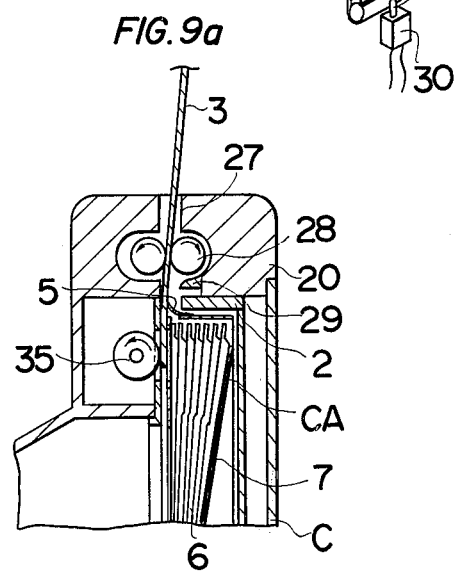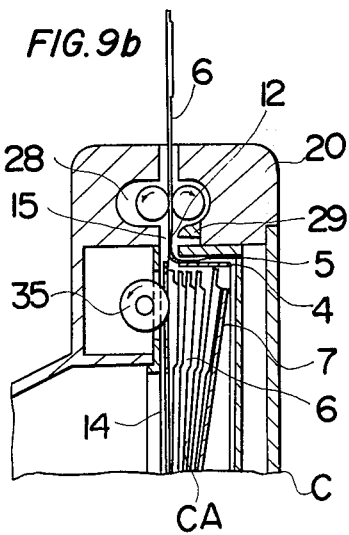

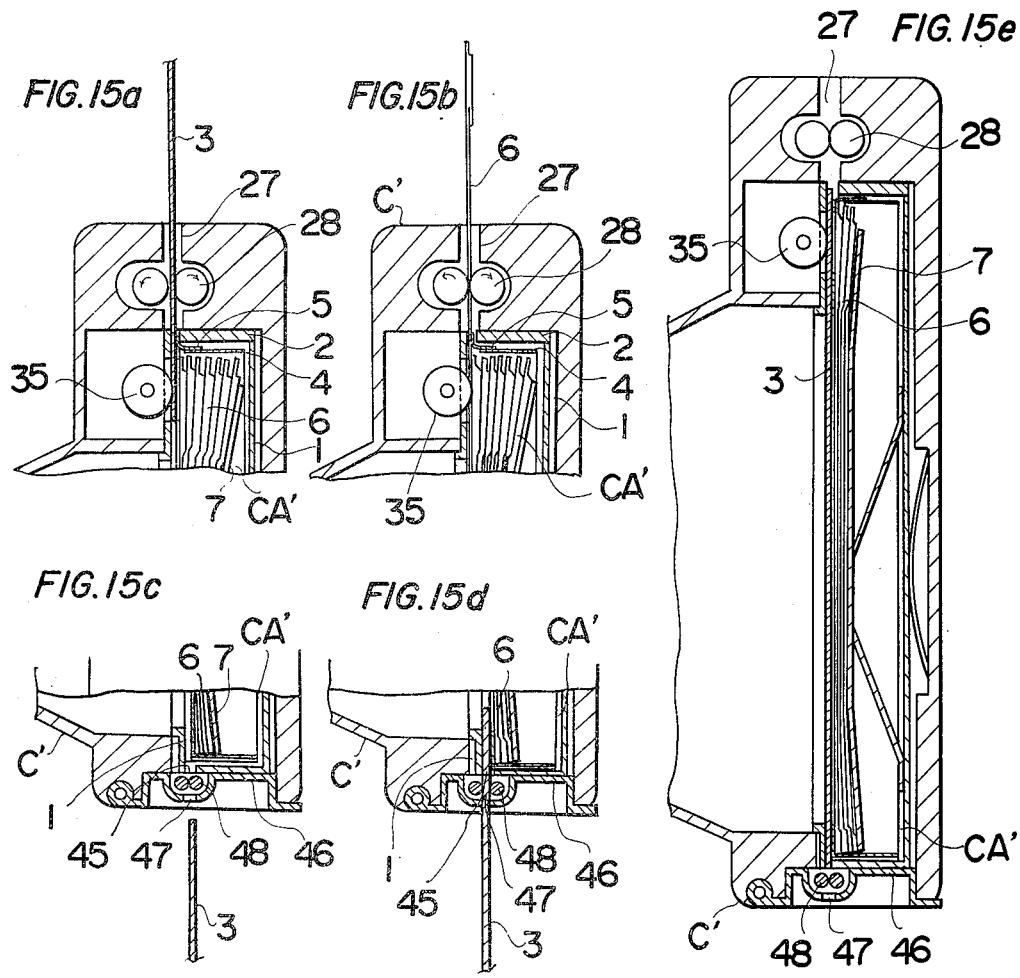
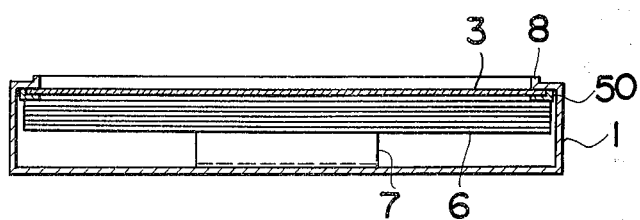
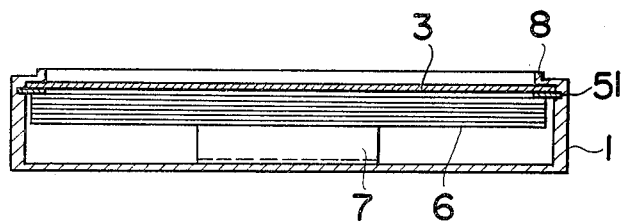

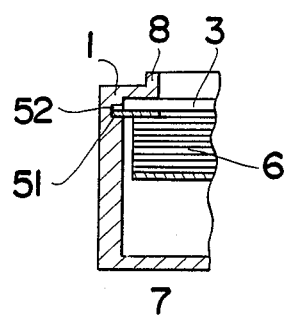
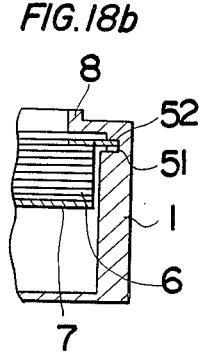
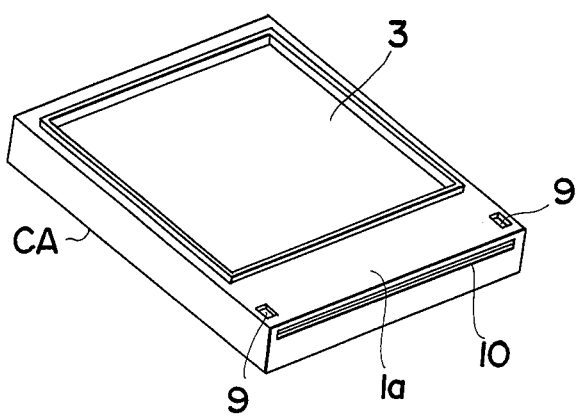
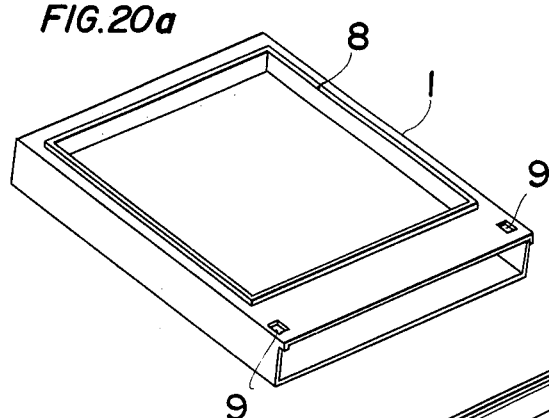
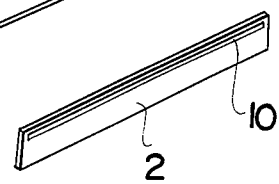
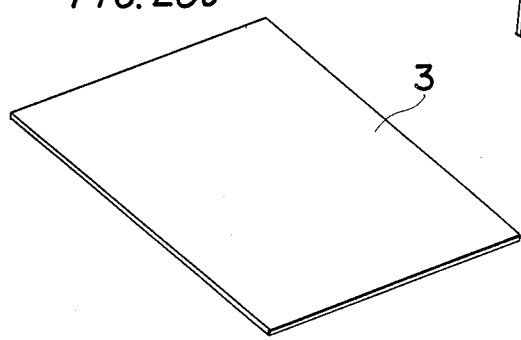

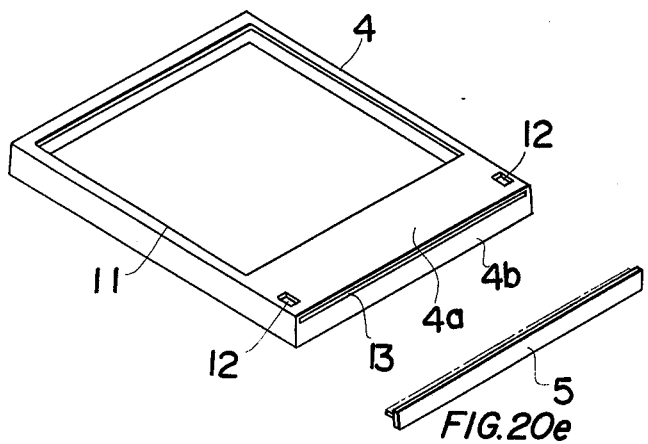
FIG.20d
FIG.20e
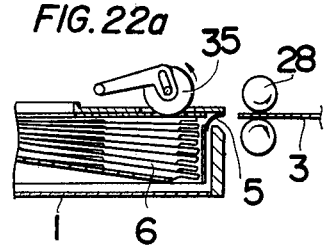
FIG.22a
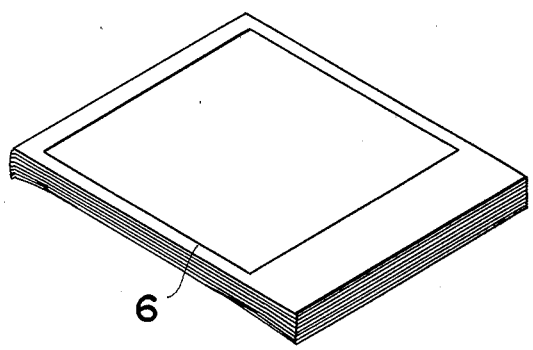
FIG.20f
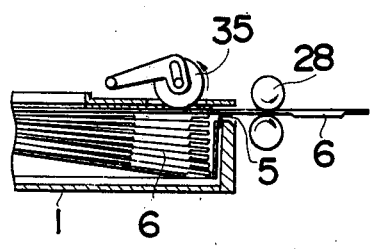
FIG.22b
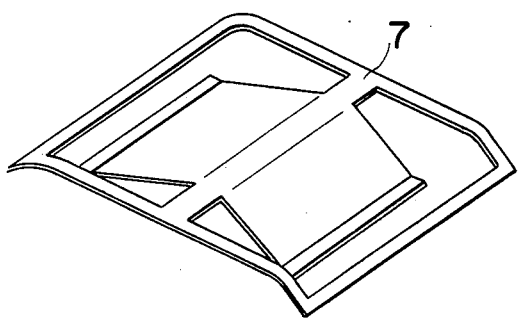
FIG.20g
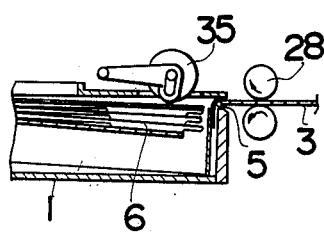
FIG.22c
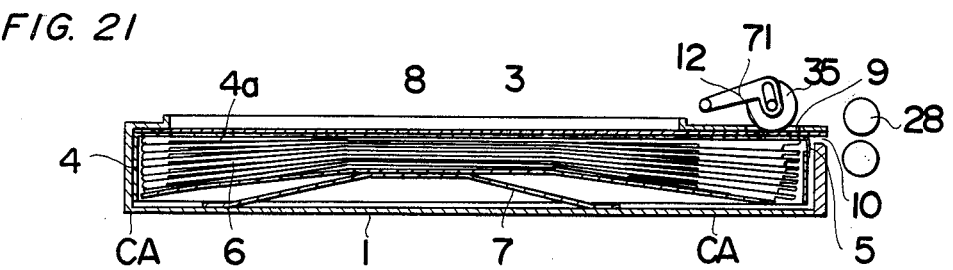
FIG.21

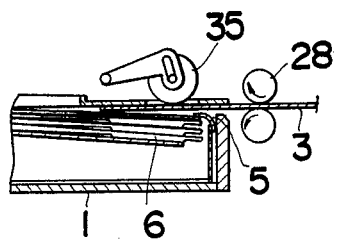
FIG.22d
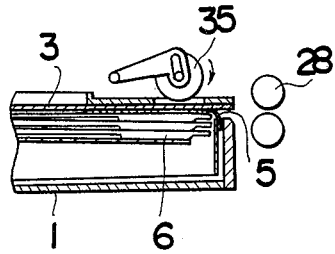
FIG.22e
FIG. 23
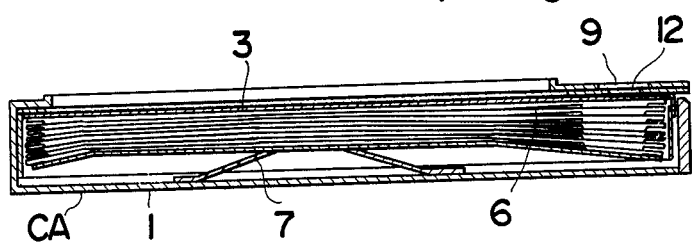
FIG. 24
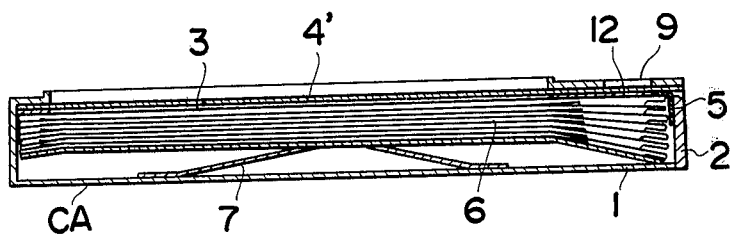
FIG. 25
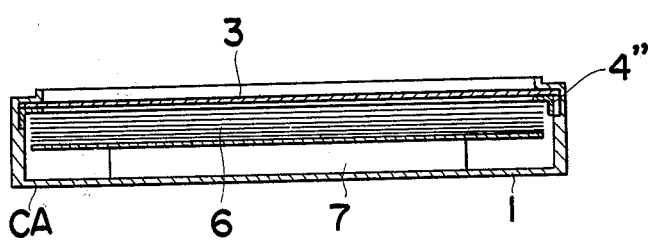
FIG. 26
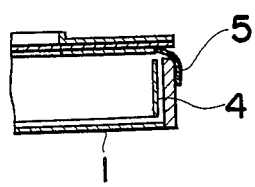
FIG. 27
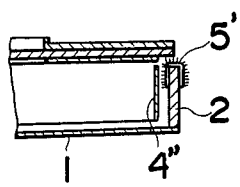

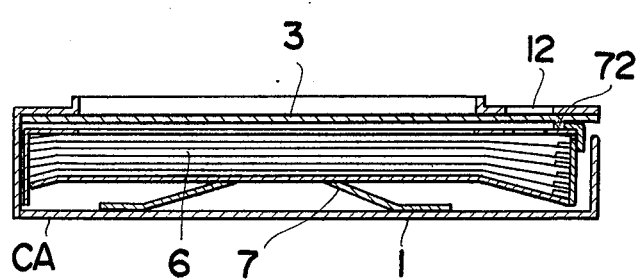
FIG. 28
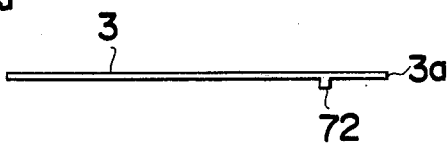
FIG. 29  FIG. 30
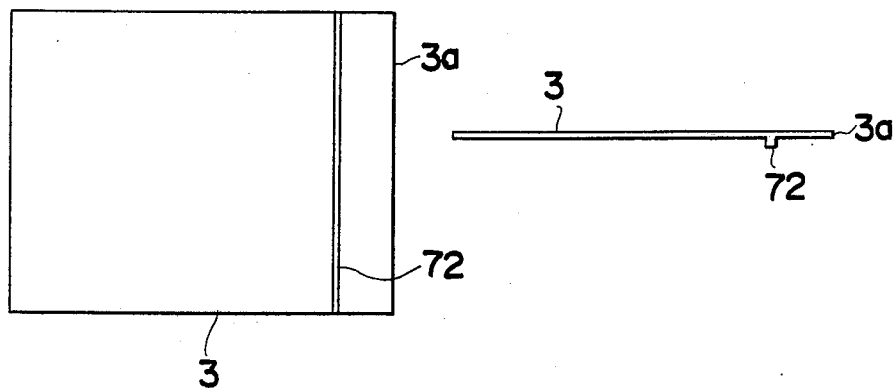
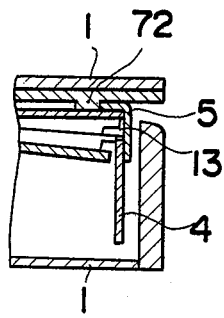
FIG. 31a
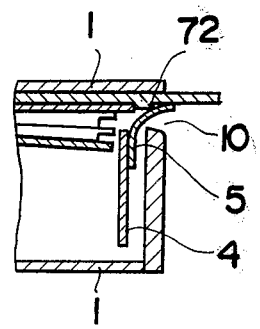
FIG. 31b

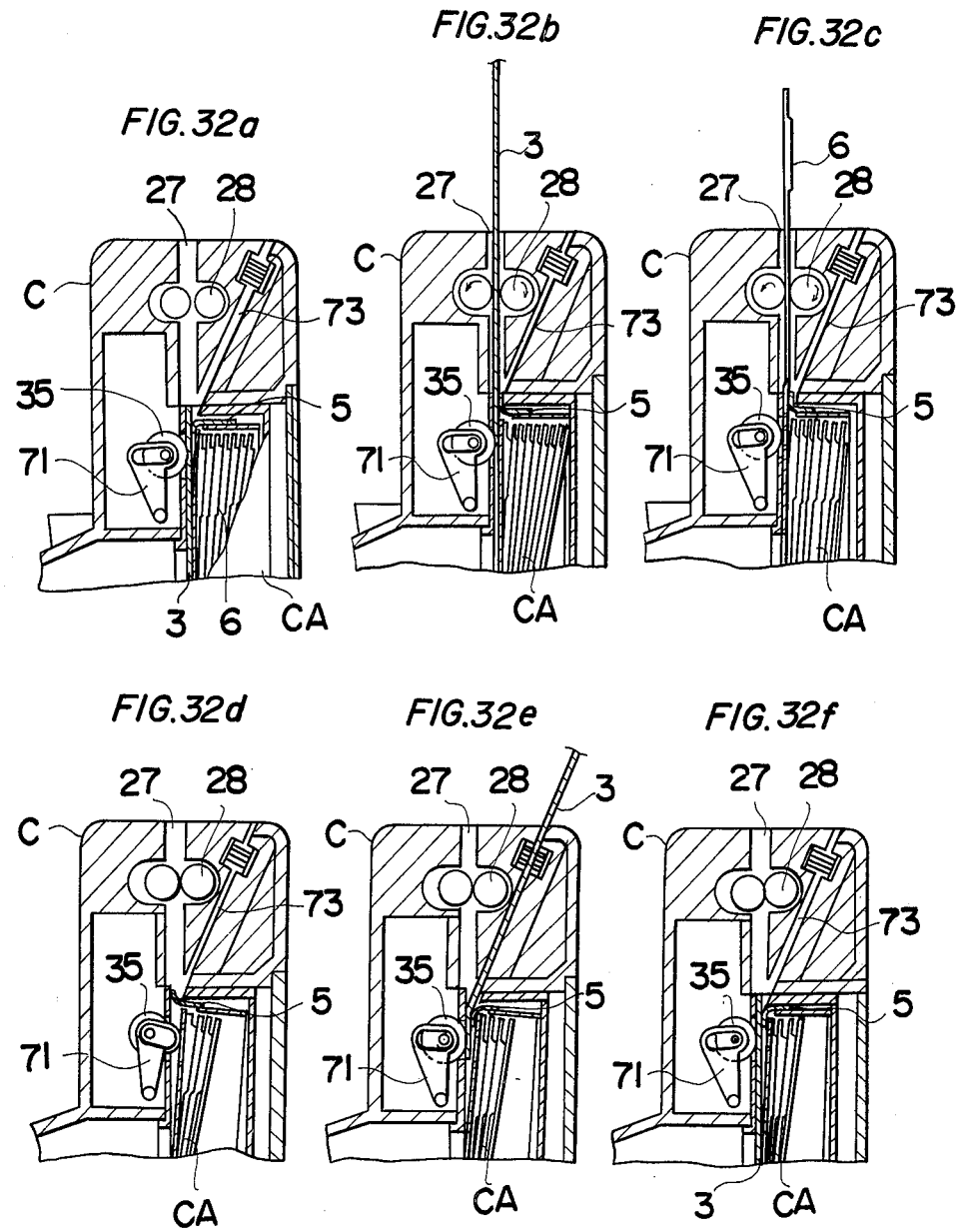

FILM CASSETTE

The present invention relates to a film cassette, and more particularly to an improved reloadable film cassette. A comparative recent advance in photographic art has been the provision of a type of film each unit of which comprises a combination of a negative film portion and a positive film portion associated with a sac containing a solution of photographic processing chemicals, and which, when employed in association with a special type of camera, makes it possible to obtain a positive image of an object on the positive film portion almost immediately after the negative film portion has been exposed to light reflected from the object. Such film goes under a variety of popular or trade names, such as instant-print film, film-sheet, monosheet, or similar apprellations. Similarly, a camera associated with this type of film may be called, for example, an auto-copy or an auto-process camera. For the purposes of the present description this type of film, and a camera associated therewith will be referred to respectively as a monosheet, and an auto-process camera.

Monosheets are conventionally provided in a cassette (or cartridge) which is loadable in an auto-process camera. Whereas many advances have been made relative to monosheets themselves, by the provision of monosheets having improved qualities, or different speeds, or sensitivities, progress relative to cassettes for containing monosheets have been relatively slight. A main disadvantage of conventional monosheet cassettes is that the cassettes are not reloadable, that is, if a cassette is removed from a camera when there are still monosheets remaining in the cassette, these monosheets are exposed, or partially exposed to light, and therefore rendered unuseable. Because of this, if, after initial loading of a cassette containing monosheets having a certain sensitivity into an auto-process camera, a photographer wishes to photograph a scene or object requiring monosheets having a different sensitivity, or other characteristics, and there are still monosheets remaining in the loaded cassette he or she must either waste the remaining monosheets, by loading a new cassette, or renounce taking the required shots. A photographer is faced with a similar problem when there are only 2–3 unexposed monosheets left in a cassette loaded in a camera, and he or she wishes to take 6–8 shots in rapid succession. In this case also, the photographer must either reload a new, full cassette, and thereby waste the remaining 2–3 monosheets, or renounce taking the required number of shots. Conventional cassettes also have the disadvantages that they are generally of complex construction, that removal of a cassette from an auto-process camera may cause damage to camera mechanisms provided for removal of exposed monosheets, particularly if the cassette is removed before all the monosheets therein have been used, and that means provided for forwarding monosheets in a cassette generally apply pressure centrally on the monosheets, whereby there may be distortion of monosheets in the cassette. Another disadvantage associated with conventional cassettes is that the front of a cassette usually comprises an open portion, which is covered by a sheet, or similar means, for protection of monosheets from exposure to light prior to loading of a cassette into a camera, this protective means generally being weak compared with the main body of a cassette, and monosheets can be damaged by a photographer inadvertently pressing the protective means.

It is accordingly an object of the present invention to provide an improved monosheet cassette.

It is another object of the invention to provide a monosheet cassette that may be loaded or unloaded into or from an auto-process camera any number of times without detriment to remnant monosheets in the cassette.

It is another object of the invention to provide a monosheet cassette having a sturdy, but light and compact, means for protection of monosheets from exposure to light prior to loading of the cassette into a camera, or during temporary unloading therefrom.

It is a further object of the invention to provide a monosheet cassette from which monosheets are easily removeable by a simple mechanism provided in an autoprocess camera, whereby there is no risk of jamming or breakage of parts during removal of the cassette from a camera.

It is a still further object of the invention to provide a monosheet cassette which is simple, compact, and economical in construction.

It is another further object of the present invention to provide a protective board for use in a monosheet film cassette which, when removed from the cassette, always moves a lightproof strip sealing a monosheet exit outwards, whereby subsequent removal of exposed monosheets is unhindered, and when inserted into the cassette always moves the strip inwards, whereby remaining monosheets in the cassette are protected from exposure to light if the cassette is unloaded from the camera.

In accomplishing these and other objects, there is provided, according to the present invention, a monosheet cassette comprising a rigid outer case, an inner frame, in which monosheets are contained, and which fits into the outer case, and a protective board, which is locatable between the front walls of the inner frame and outer case. Both the outer case and inner frame have matching open front portions through which a foremost monosheet in the cassette may be exposed, small hole portions through which a camera mechanism for removal of monosheets may act, and slit portions through which monosheets or the protective board may pass. At opposite sides of the front wall of the inner frame there are formed forwardly projecting wall portions, which contact the rear side of the front wall of the outer case, there thus being formed a portion for accommodation of the protective board between the inner frame and outer case front walls, and which act as runners for the protective board upon removal or re-insertion thereof from or into the cassette. Monosheets are urged forwards into contact with the front wall of the inner frame by a spring plate mounted on the inside of the rear wall of the outer case, the foremost monosheet being brought into a position for exposure, and into line with removal slits in the inner frame and outer case. Prior to use of the cassette, entry of light thereinto is prevented by the protective board. When the cassette is loaded into an auto-process camera, the protective board is removed by a camera mechanism for removal of monosheets, after which successive monosheets may be exposed and removed. If it is required to unload the cassette before exposure of all the monosheets therein, the protective board may be re-inserted into its original position in the cassette by reverse action of the monosheet removal mechanism, or by a manually actuated means, and the cassette then unloaded, the remaining monosheets being protected from exposure to light, and thus available for subsequent use. The cassette of the invention may be further provided with a flexible light-proof strip, which is for prevention of entry of light through the monosheet removal slit of the cassette, and which is moved inwards or outwards with respect to the cassette upon insertion or removal of the protective board into or from the cassette, and which comprises a rib portion which contacts the forward end of a lightproof strip for protection of the monosheet exit, and pushes the strip outwards or inwards with respect to the cassette when the board is removed from or inserted into the cassette, whereby the strip is always correctly moved to a required alignment, either to permit removal of exposed monosheets from the cassette, or to prevent entry of light through the monosheet exit.

These and other objects and features of the present invention will become apparent from the following description made in conjunction with preferred embodiments with reference to the accompanying drawings, in which.

Figure 1:
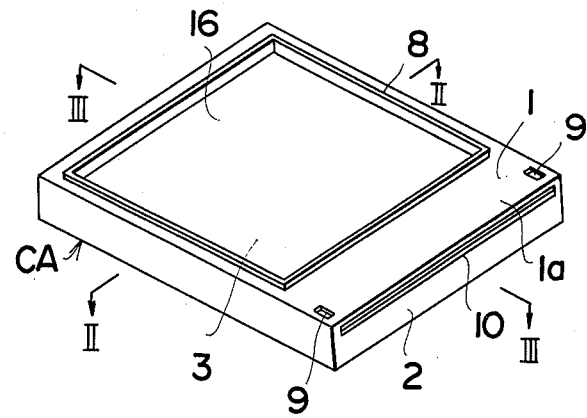
FIG. 1 is a perspective view of a film cassette according to one embodiment of the invention.
Figure 10:
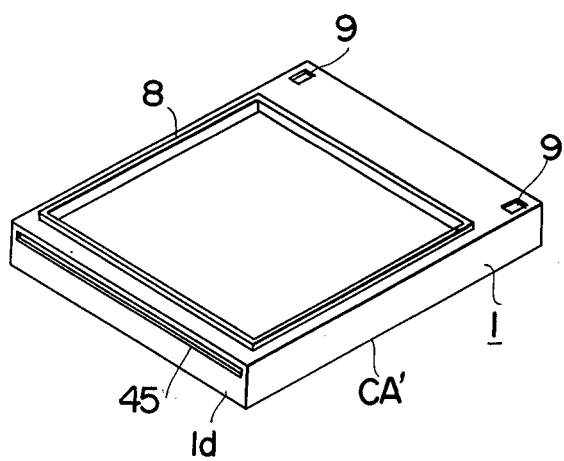
Figure 11:
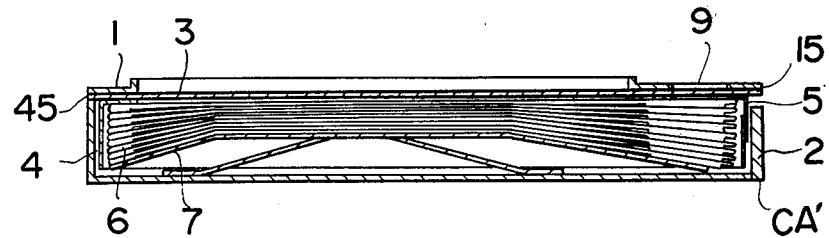
Figure 12:
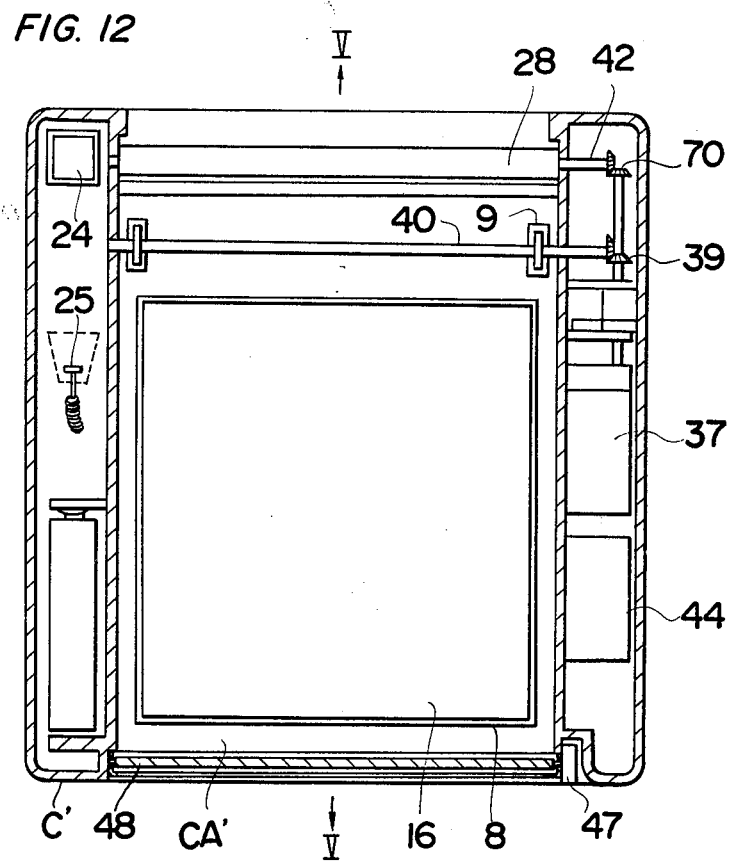
Figure 13:
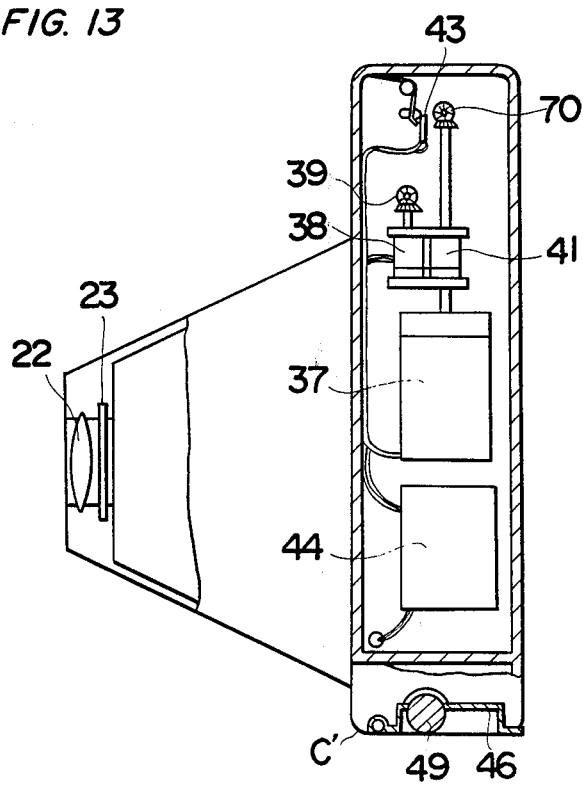
Figure 14:
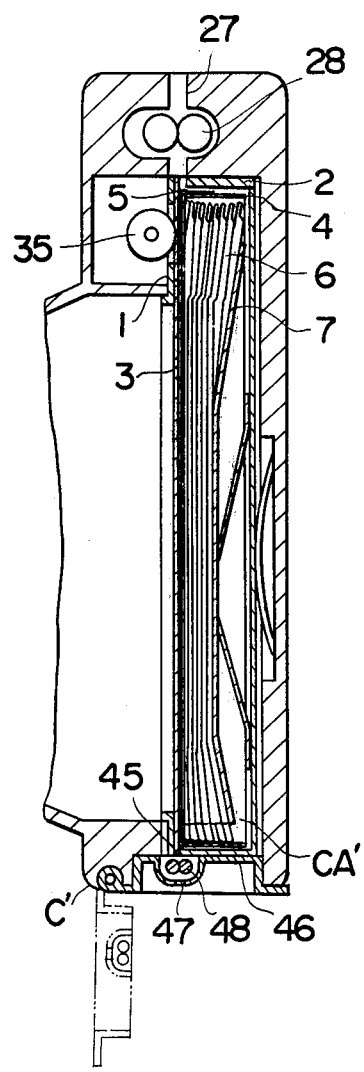

FIG. 4(a)-(g) are perspective views of constructional parts of the cassette of FIG. 1;

FIG. 5 is a front view partially in section of a camera employable in association with the cassette of FIG. 1;

FIG. 6 is a side view partially in section of the camera of FIG. 5;

FIG. 7 is a detail view of a guide bar employed in the camera of FIG. 5;

FIG. 8 is a cross-sectional view taken through the line IV—IV of FIG. 5;

FIG. 9(a)-(e) is an explanatory drawing illustrating employment of the cassette of FIG. 1;

FIG. 10 is a perspective view of a film cassette according to a 2nd embodiment of the invention;

FIG. 11 is a lengthwise cross-sectional view of the cassette of FIG. 10;

FIG. 12 is a front view partially in section of a camera employable in association with the cassette of FIG. 10;

FIG. 13 is a side view partially in section of the camera of FIG. 12;

FIG. 14 is a cross-sectional view taken through the line V—V of FIG. 12;

FIG. 15(a)-(e) is an explanatory drawing illustrating employment of the cassette of FIG. 10;

FIG. 16 is a cross-sectional view of a film cassette according to a 3rd embodiment of the invention;

FIG. 17 is a cross-sectional view of a film cassette according to a 4th embodiment of the invention;

FIG. 18(a) and (b) are cross-sectional views showing a frame in different positions in the cassette of FIG. 17;

FIG. 19 is a perspective view of showing the film cassette according to a 5th embodiment of the invention;

FIGS. 20(a)-(g) are perspective views of constructional parts of the cassette of FIG. 19;

FIG. 21 is a cross-sectional view showing relation between the cassette of FIG. 19 and a camera mechanism;

FIGS. 22(a)-(e) is a explanatory view of the action of the camera mechanism shown in FIG. 21;

FIGS. 23-27 show modifications of the film cassette of FIG. 19;

FIG. 28 is a cross-sectional view of a film cassette according to a 6th embodiment of the invention;

FIG. 29 is a plan view of a lightproof board employed in FIG. 28;

FIG. 30 is a side view of the board of FIG. 29;

FIGS. 31(a)-(b) is explanatory drawing showing action effected by the lightproof board of FIG. 29; and FIG. 32(a)-(f) is explanatory drawing illustrating removal and re-insertion of the lightproof board of FIG. 29 from and into a cassette loaded in a camera.

Before the description of the present invention proceeds, it is to be noted that like parts are designated by the like reference numerals throughout the several views of the accompanying drawings. It is further to be noted that terms such as front, forwards, rear, rearwards, upper, or lower are to be taken as being reference to a normally upright, forward pointing camera, or to a cassette loaded therein.

Referring initially to FIG. 1, there is shown the outer case 1 of a cassette CA. The outer case 1 is made of a suitable rigid, lightproof material, such as thermosetting plastic, metal sheet, or thick cardboard. In the front wall 1a of the outer case 1 there is formed a large opening 16, which is defined by front wall portions 8, which has dimensions equal to those of the negative film portion of a monosheet 6, and through which a foremost monosheet 6 in the cassette CA may be exposed. The front wall portions 8 project forward slightly with respect to the rest of the front wall 1a, and fit into a complementary shaped mounting portion provided in an autoprocess camera C, whereby the opening 16 is correctly aligned with the camera lens. The leading end of the outer case 1, that is, the end from which exposed monosheets 6 are removed, is constituted by an end wall 2, which may be detachable. Between the front edge of the end wall 2 and the rear side of the front wall 1a, there is formed a slit 10 through which exposed monosheets 6, or a protective board 3, described below, may be removed from the cassette CA. Near opposite corners of the leading end portion of the outer case front wall 1a, there are formed two small, generally rectangular openings 9, which permit entry of a camera mechanism for removing the protective board 3 or monosheets 6 from the cassette CA.

Referring to FIG. 4d, there is shown an inner case 4, which is made of a suitably strong, light material such as aluminium sheet, and which fits into the outer case 1. The inner frame 4 is constituted by a front wall 4a, a leading end wall 4b, left and right side walls 4c, and a bottom end wall 4d. In the inner frame front wall 4a, there is formed a large opening 11, and, near opposite corners of the leading end thereof, there are formed two small, generally rectangular openings 12. The large opening 11 and small openings 12 in the inner frame front wall 4a correspond to the exposure opening 16 and small openings 9, respectively, in the outer case front wall 1a, and come into alignment therewith. In the leading end wall 4b of the inner frame 4 there is formed a removal slit 13, through which exposed monosheets 6 may be removed, as described below. The left and right side walls 4c of the inner frame 4 each form a forward projection 4cl, which projects forward of the plane of the front wall 4a, and which extends the length of the corresponding side wall 4c. The front edges of the side wall projections 4cl contact the rear side of the outer case front wall 1a, and there is thus formed a compartment 14 which is between the inner frame front wall 4a and one outer case front wall 1a, and which connects to an opening 15 that is parallel to the removal slit 13 in the inner frame end wall 4b, and separated therefrom by the edge of the frame front wall 4a.

Figure 2:
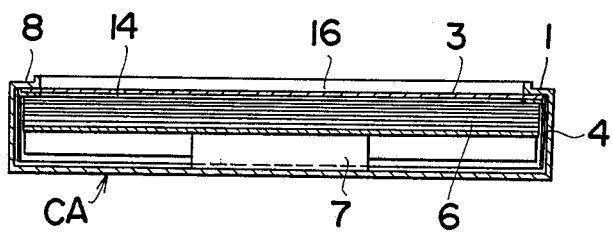
FIG. 2 is a cross-sectional view taken through the line II—II of FIG. 1.
Figure 3:
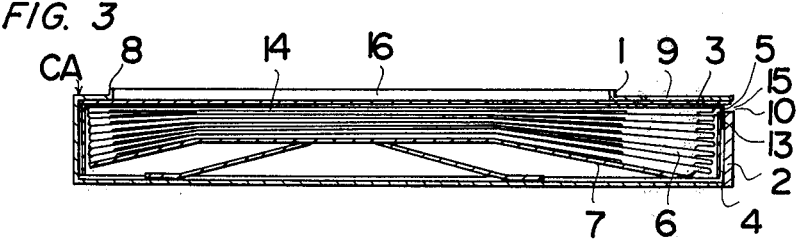
FIG. 3 is a cross-sectional view taken through the line III—III of FIG. 1.
Figure 4A:
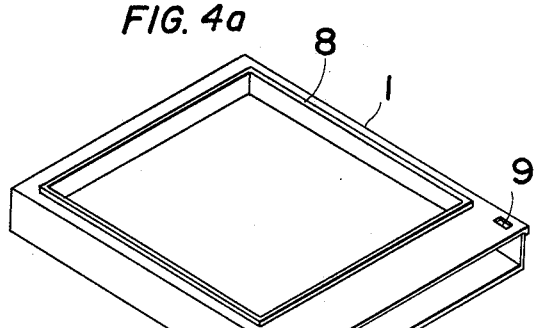
Figure 4C:
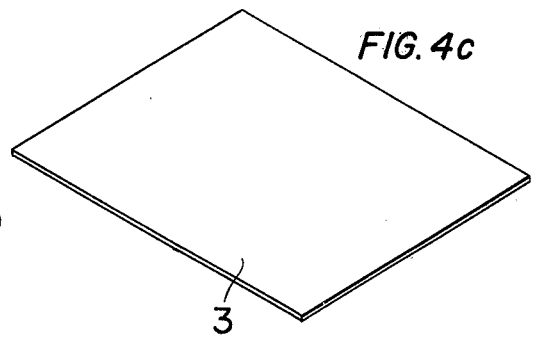
Figure 4B:
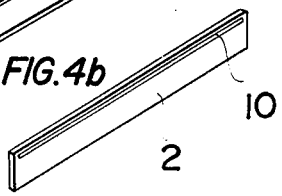

In FIGS. 2, 3, which show an assembled cassette CA, the removal slit 13 and compartment opening 15 both lie in line with the outer case slit 10, which has a width slightly greater than the combined widths of the inner frame slit 13 and compartment opening 15. Monosheets 6 are provided within the frame 4, and are urged towards the front wall 4a thereof by a plate spring 7, which is mounted on the inner side of the rearwall of the outer case 1. The monosheets 6 being thus urged forwards, the foremost monosheet 6 is brought to a position in which it is in line with the removal slit 13 and rear portion of the slit 10, and in which the negative film portion thereof is framed in the large openings 11 and 16 of the inner frame 4 and outer case 1. During non-use of the cassette CA, i.e., when the cassette CA is not loaded in a camera, monosheets 6 therein are protected from exposure to light by the abovementioned protective board 3 and by a lightproof strip 5.

Still referring to FIGS. 2, 3, the protective board 3 is made of carboard, plastic, or similar material and, has dimensions generally equal to those of the inner frame front wall 4a, and fits into the compartment 14 formed between the outer case front wall 1a and inner frame front wall 4a. In this position, the board 3 prevents entry of light through the large opening 11 of the inner frame 4, and is in line with the compartment opening 15 and the forward portion of the slit 10, through which the board 3 may be removed. When the protective board 3 is moved into or out of the cassette CA, the side wall forward projections 4cl of the inner case 4 acts as runners therefor.

In FIG. 3, the strip 5 is made of a flexible lightproof material, such as metal foil, is generally equal in length to the inner frame leading end wall 4b, and the rear edge thereof is fixedly bonded or otherwise attached to the rear side of the end wall 4b. The strip 5 has a width greater than the distance from the outer case front wall 1a to the line of attachment of the strip 5 to the end wall 4b. When the protective board 3 is in position in the compartment 14, the strip 5 is bent around the corner of the inner frame front wall 4a and end wall 4b, and the forward, unattached portion thereof is held between the protective board 3 and the front wall 4a, whereby the strip 5 covers the removal slit 13, and the monosheets 6 are completely protected from exposure to light.

Reference is now had to FIGS. 5 through 9, which illustrate an auto-process camera C associable with a film cassette according to the invention, and the employment of a cassette CA therein.

In FIGS. 5, 6, the camera C comprises a main body 20, which is provided with a viewfinder 24, shutter release button 25, and rearcover 26, and a lens mount portion 21, which is attached to the front of the camera main body 20, and carries a lens 22 and a shutter 23. The camera main body 20 accommodates the cassette CA at a predetermined set-position and menas relating to use thereof. These means are controlled through a control box 44, and include, for example, a motor 37, which is provided in a generally central, left-hand portion of the main body 20, and is actuated upon depression of the shutter release button 25. The motor 37 supplies drive through a 1st electromagnetic clutch 38 and bevel gear train 39 to a 1st rotatory shaft 40, and through a 2nd electromagnetic clutch 41 and bevel gear train 70 to a 2nd rotatory shaft 42. The 1st rotatory shaft 40 is in a left to right alignment in the camera C, and lies in line with the small openings 9 of the outer case 1 of a cassette CA loaded in the camera C. A friction roller 35 which is fixedly mounted on the shaft 40 extends into each opening 9, and contacts the front side of the protective board 3. The 2nd rotatory shaft 42 is coaxially mounted with and transmits drive to one roll in a pair of a processing rolls 28.

As shown most clearly in FIG. 8, the processing rolls 28 are provided in an extraction passage 27, which is formed in the upper part of the camera main body 20, the passage 27 and rolls 28 being in line with the slit 10 of the loaded cassette CA, and therefore also in line with the foremost monosheet 6 therein. The processing rolls 28 may extract a monosheet 6 from the camera C and simultaneously effect development of a negative image formed thereon in a conventionally known manner. When a monosheet 6 passes between the processing rolls 28, one roll 28 is moved slightly away from the other roll 28, and actuates a micro-switch 43 (FIG. 6), whereupon the microswitch 43, acting through the control box 44, causes immediate disengagement of the 1st clutch 38 connecting drive from the motor 37 to the 1st rotatory shaft 40, and, after a delay, disengagement of the 2nd clutch 41, and stopping of the motor 37.

Referring to FIGS. 6, 7, 8, a guide bar 29 is provided in a rear portion of the extraction passage 27, below the processing rolls 28. In FIG. 7, one end of the guide bar 29 is fixedly attached to one arm of a pivotally mounted lever 32. The other arm of the lever 32 connects to a plunger 31 which is actuated by a solenoid 30. In FIG. 6, the solenoid 30 is actuated upon closure of a switch 34, which is closed by depression of a push-button 33 provided externally on a lower portion of the camera main body 20, and which also causes reverse drive to be supplied by the motor 37 to the 1st and 2nd rotatory shaft 40 and 42. The lever 32 is normally in a position in which the guide bar 29 is held in a rearmost position, as indicated by the solid line portion of FIG. 6. When the solenoid 30 is actuated, the lever 32 is pivoted to move the guide bar 29 forwards, as indicated by the dotted line portion of FIG. 6. When in a rearmost position, the guide bar 29 lies out of line with the slit 10 of the cassette CA, as shown in FIG. 8. When moved to a forward position, the guide bar 29 is directly in line with the removal slit 13 in the cassette inner frame 4 and with the rear portion of the outer case slit 10.

In FIG. 9, when the cassette CA has been loaded into the camera C, and the rear cover 26 is closed, a blank shot is taken. This causes the 1st and 2nd shafts 40 and 42 to be rotated and supply drive to the friction rollers 35, and processing rolls 28. Since the friction rollers 35 contact the protective board 3, through the outer case openings 9, the board 3 is drawn out of the compartment 14 (FIG. 4), through the compartment opening 15, through the slit 10, into the passage 27 and up to the processing rolls 28. When the board 3 comes between the rolls 28, the micro-switch 43 (FIG. 6) is closed, and the 1st clutch 38 is disengaged, whereby drive to the 1st shaft 40 and friction rollers 35 ceases, thus ensuring that only the board 3, and not a monosheet 6 also, is withdrawn from the cassette CA. The processing rolls 28 continue to draw the board 3 from the cassette CA, and direct the board 3 up through the passage 27, to the exterior of the camera C, as shown in FIG. 9(a). When sufficient time has elapsed for the board 3 to pass the rolls 28, drive from the motor 37 is stopped and the 2nd clutch 41 is disengaged. Prior to this, when the protective board 3 completely leaves the cassette CA, the friction rollers 35 move inwards slightly with respect to the cassette CA, and extend through the outer case openings 9 and also through the openings 12 in the inner frame front wall 4a, to contact the foremost monosheet 6 in the cassette CA, as indicated in FIG. 9(b). The openings 9, 12 and rollers 35 being well spaced laterally, the rollers 35 contact support rim portions of the monosheet 6, and avoid film surface or developer portions thereof.

Figures 9C, 9D, 9E:
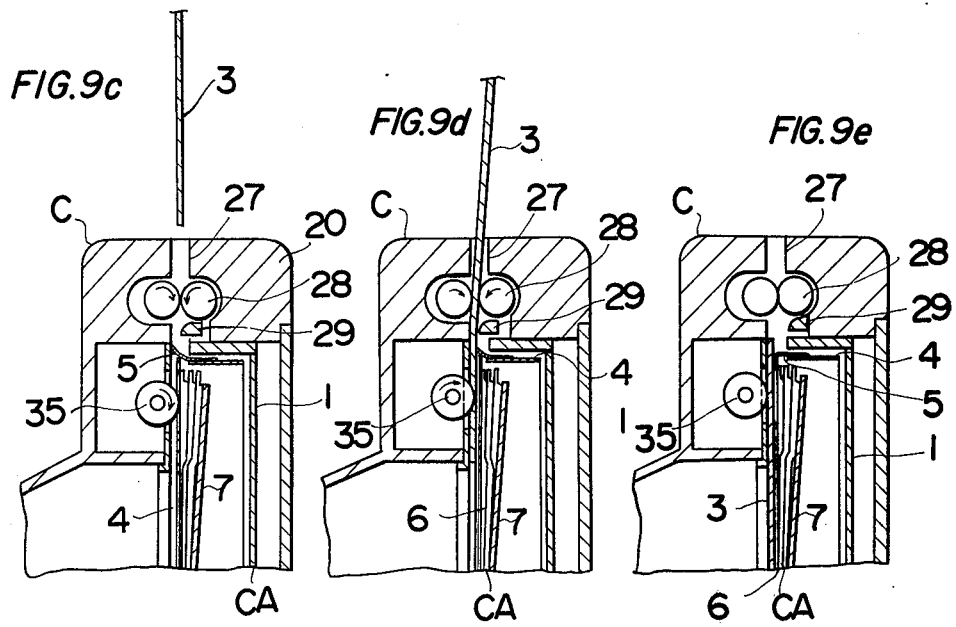

Still in FIG. 9, when the protective board 3 is being moved out of the cassette CA, the lightproof strip 5 hitherto closing the monosheet removal slit 13 of the inner frame 4 is pushed outwards with respect to the cassette CA, as shown in FIG. 9(a). When the board 3 has been moved away from the cassette CA, the strip 5 remains outwardly curved with respect to the cassette CA, and the forward portion thereof is flexed against the rear side of the outer case front wall 1a, as indicated in FIG. 9(c).

Referring back to FIG. 9(b), when the shutter release button 25 is depressed, to effect exposure of the foremost monosheet 6, this exposed monosheet 6 is removed from the cassette CA and camera C by the friction rollers 35 and processing rolls 28, in the same manner as the protective board 3, the lightproof strip 5 being pushed slightly rearwards as the monosheet 6 leaves the cassette CA. As well as causing the monosheet 6 to move out of the camera C, the processing rolls 28 also effected development of an image thereon in a conventionally known manner. After removal of this monosheet 6 from the cassette CA, the remaining monosheets 6 are moved forwards by the spring plate 7, whereby the next foremost monosheet 6 is brought into contact with the friction rollers 35, by which it may be removed after exposure, and so on for other monosheets 6.

If it is required to unload the cassette CA before all the monosheets 6 therein have been exposed, the protective board 3 is inserted back into the upper portion of the extraction passage 27 of the camera C, and the push button 33 (FIG. 6) is depressed. This causes the guide bar 29 to be moved to a forward position, and the rolls 28 and rollers 35 to be rotated in directions for drawing objects into the camera C and cassette CA, as indicated in FIG. 9(c). When drawn downwards by the rolls 28, the board 3 comes into contact with the front of the guide bar 29, and is guided thereby into line with the compartment opening 15, as shown in FIG. 9(d). When entering cassette CA, the board 3 pushes the lightproof strip 5 inwards with respect to the cassette CA, whereby the forward portion of the strip 5 is again held between the board 3 and inner frame front wall 4a, and the strip 5 again covers the monosheet removal slit 13. During reverse drive of the motor 37, the switch 43 actuated by the rolls 28 functions to stop drive by the rolls 28 and rollers 35 after a certain time, and the board 3 is drawn by the rolls 28 and rollers 35, and then by the rollers 35 only into the cassette CA. As indicated in FIG. 9(e), when the board 3 has been drawn completely into the cassette CA, rotation of the rolls 28 and roller 35 is stopped, and the guide bar 29 is moved to a rearward position. The protective board 3 and lightproof strip 5 are now in their original configuration, and the cassette CA may therefore be unloaded from the camera C, without there being any risk of exposure of remaining monosheets 6 to light.

In another embodiment of the invention, shown in FIGS. 10, 11, the cassette CA' comprises another opening 45, which is equal in dimensions to, and is in line with the compartment opening 15, and is formed in the outer case end wall opposite to the leading end wall 2. In this embodiment, the protective board 3 is withdrawn from the cassette CA through the opening 15, and re-inserted through the opening 45.

FIGS. 12 through 14 show an auto-process camera C' employable in association with the cassette CA'. The camera C' is generally the same as a camera associated with the 1st embodiment of the invention, except that the guide bar 29 and associated means may be omitted, that the motor 37 need only supply forward drive, and that the cassette CA' is loaded into the camera C' through a bottom cover 46. The cover 46 comprises a well portion which contains a pair of feed rolls 48, and in which there is formed a slit 47, as shown most clearly in FIG. 14. To permit loading of the cassette CA' into the camera C', the cover 46 is opened to a position indicated by the chain dot line portion of FIG. 14. When the cover 46 is closed, the slit 47 and feed rolls 48 are in line with the re-insertion opening 45 of the loaded cassette CA'. In FIGS. 12, 13, the feed rolls 48 connect to and are rotatable by a knob 49, which is provided at a lower portion of the camera C', externally thereto, and is actuable manually.

Removal of the protective board 3 or a monosheet 6 from the loaded cassette CA', which is illustrated in FIG. 15(a), 15(b), is effected in the same manner as in the 1st embodiment, and description thereof is therefore omitted. Referring to FIG. 15(c), 15(d), 15(e), if it is wished to temporarily unload the cassette CA', the protective board 3 is inserted through the slit 45 in the cover 46, and advanced into contact with the feed rolls 48. The knob 49 is then turned manually, which causes the rolls 48 to advance the board 3 through the opening 45 in the cassette end wall and into the compartment 14. The cassette CA' may now be unloaded, since the board 3 now protects the monosheets from exposure to light through the exposure opening 11 and the lightproof strip 5 is flexed against the outer case front wall 1a, and so prevents entry of light through the monosheet removal slit 13.

In another embodiment of the invention, shown in FIG. 16, the inner frame 4 is dispensed with, and the protective board 3 is guided into, and positioned in the cassette CA by runners 50, which are fixedly attached to the rear side of the outer case front wall 1a, and extend the length of the outer case 1, there being one runner 50 along each side of the case 1 interior. Each runner 50 is generally L-shaped in cross-section, has a forward portion fixedly attached to the front wall 1a, and a portion extending towards the center line of the cassette CA and generally parallel with the front wall 1a. Monosheets 6 are urged forwards, into contact with the rear portions of the runners 50 by the spring 7, and the protective board 3 is provided in contact with the rear of the front wall 1a and between the runners 50.

In another embodiment of the invention, shown in FIG. 17, a groove 52 is formed in the inside of each outer case side wall 1c, near the front wall 1a. A flat frame 52 defining a large open portion is supported in the groove 51, monosheets 6 are urged into contact with the rear of the flat frame 52, and the protective board 3 is provided between the frame 52 and the outer case front wall 1a. As shown in FIG. 18(a) and (b), the width of the grooves 51 is greater than the thickness of the flat frame 52, whereby the frame 52 may move to a forward or to a rearward position in the grooves 51. When the protective board 3 is in the cassette CA, the frame 52 is pushed to the rearward position, as shown in FIG. 18(a). When the protective board is removed from the cassette CA', the force of the spring plate 7 transmitted through the monosheets 6 pushes the rim 52 to the forward position, as shown in FIG. 18(b). That portion of the frame 52 adjacent to the slit 10 may form a bevel edge, to permit easy re-insertion of the protective board 3.

In the embodiment of FIGS. 16 and 17, monosheets 6 are removed, and the board 3 is removed or re-inserted in the same manner as described earlier, and the cassette CA may comprise a single removal slit 10, or may also have a re-insertion slit 45. In all the abovedescribed embodiments, slits 10, 13, or openings 1, 45 may, of course, be provided with pile surfaces, or other means to further ensure exclusion of light.

In the embodiment of FIGS. 19 to 22, the forward projections $4C_1$ of left and right side walls of the inner frame 4 are omitted and the front wall 1s of the inner frame 4 extends the upper ends of the left and right side walls 4c.

As shown in FIGS. 19 and 20(a) to (g), near each corner of the front wall 1a, at the leading end of the case 1, there is formed a small, generally rectangular opening 9. The openings 9 permit a mechanism provided in an auto-process camera to extend through the front wall 1a, and contact and remove monosheets 6 from the cassette CA, as described below. The inner frame 4 is made of a light, stiff material, such as aluminium sheet and as shown in FIG. 20(d), comprises front, side, and end walls, and is open at the rear. In the front wall 4a of the frame 4, there is formed an opening 11, which is equal in dimensions to the exposure opening 10 of the outer case front wall 1a and to the negative film portion of a monosheet 6. The leading end portion of the front wall 4a is generally equal in dimensions to the leading end portion of a monosheet 6, and near two corners thereof there are formed small, generally rectangular openings 12, which are narrower than the openings 9 in the outer case front wall 1a. A slit 13 is formed in the front portion of the end wall 4b provided at the leading end of the inner frame 4. When the inner frame 4 is contained within the outer case 1, the front opening 11, small openings 12, and slit 13 of the inner frame 4 align with the exposure opening 8, small openings 9, and removal slit 10, respectively, of the outer case 1.

Referring now to FIG. 21, monosheets 6 packed in the cassette CA lie in the frame 4, and are urged towards the front of the cassette CA by the plate spring 7, which contacts the rearmost monosheet 6, pressure from the plate spring 7 thus being transmitted through the monosheets 6 to the foremost monosheet 6, which is in contact with the rear of the frame front wall 4a, whereby the inner frame 4 also is urged forwards by the force of the plate spring 7. The leading end portions of the monosheets 6 lie in the leading end portion of the cassette CA, and the negative film portions thereof face the front of the cassette CA and are aligned with front opening 11 of the inner frame 4 and with the exposure opening 8 of the outer case 1. Prior to loading of the cassette CA into a camera, the lightproof board 3 is contained inside the case 1, is located between the inner frame front wall 4a and the outer case front wall 1a, and is urged into contact with the outer case front wall 1a by the force of the spring 7 transmitted through the frame 4. The board 3 thus protects the monosheets 6 from exposure to light passing through the outer case exposure opening 8 or openings 9, and also lies in line with the outer case slit 10 of the outer case 1.

Referring now to FIG. 22, the cassette CA is loaded into an auto-process camera C comprising processing rolls 28, friction rollers 35, for the removal of monosheets 6, and associtaed slide levers 71. When loaded in the camera C the cassette CA fits into a complementary shaped portion of the camera C, the front wall 1a and opening 11 of the case 1 and inner frame 4 lie in line with an exposure frame to which external light is directed by the camera lens, the outer case slit 11 lies in line with the processing rolls 28, and the friction rollers 35 are in line with and extend into the small openings 9 in the outer case front wall 1a whereby the rollers 35 contact the front side of the lightproof protective board 3. Each slide lever 71 comprises an actuation portion, which is connected to a camera mechanism for determining the position of the lever 71, and a push projection which is slidably mounted on an extension of the rotatory shaft of a roller 35. Each lever 71 is normally held out of contact with the cassette CA, but the actuation portion thereof may be moved in such a manner that the push projection thereof slides along the extension of the rotatory shaft of the corresponding roller 35, and the rear end of the push projection enters the corresponding opening 9 of the outer case 1, to contact the inner frame front wall 4a, and press the inner frame 4 rearwards. As noted earlier, the openings 12 in the inner frame front wall 4 a are smaller than the openings 9 in the outer case front wall 1a. The push projections of the levers 71 may pass through the openings 9, but may not pass through the openings 12.

Still referring to FIG. 22, when the cassette CA is loaded into the camera C, first a blank shot is taken, by pressing the shutter button of the camera C, while maintaining a cover over the camera lens, or by a similar procedure. Through suitable linkages provided in the camera C, this action causes to rotate the rollers and rolls 28 in directions in which objects may be withdrawn from the cassette CA, as indicated by the arrows of FIGS. 22(a) and (b). Contact of the friction rollers 35 with the protective lightproof board 3 causes the board 3 to be drawn out of the cassette CA, through the slit 10, thus uncovering the negative film portion of the foremost monosheet 6. When, or just after, the leading end of the board 3 is engaged between the press rolls 28, rotation of the friction rollers 35 is stopped. Thereafter, the board 3 is withdrawn completely from the cassette CA by the press rolls 28, and directed thereby towards and through an extraction outlet provided in the camera C, as indicated in FIG. 22(a). After complete removal of the baord 3, rotation of the press rolls 28 also is stopped.

As the protective board 3 is withdrawn from the cassette CA in the manner described above, contact between the board 3 and the lightproof strip 5 causes the forward, free end of the strip 5 to be drawn partially through the removal slit 10, the strip 5 thus now being curved outwards with respect to the cassette CA. Also, when the board 3 had been completely removed from the cassette CA, the plate spring 7 pushes the monosheets 6 and the inner frame 4 forwards a distance equal to the thickness of the protective board 3, thereby bringing the front wall 4a of the frame 4 into close contact with the front wall 1a of the case 1. When the monosheets 6 and frame 4 have been thus moved forwards, the forward end of the strip 5, while still remaining curved outwards with respect to the cassette CA, presses against the rear side of the outer case front wall 1a, thus providing extra protection against entry of light into the cassette CA through the removal slit 10. At the same time the slit 13 of the inner frame 4 comes into alignment with the slit 10, and the foremost monosheet 6 in the cassette CA is brought into a position in which it may be correctly exposed through the openings 8, 11 in the outer case 1 and frame 4, and is in line with the slits 10, 13, and in which the friction rollers 35 contact the leading end portion thereof through the openings 9, 12 as shown in FIG. 22(a).

When, after this, the camera shutter button is pressed, in order to expose the foremost monosheet 6', the roller 35 and press rolls 28 are rotated, in the same manner as for withdrawal of the protective board 3, and the foremost monosheet 6 is withdrawn from the cassette CA, as indicated in FIG. 22(b), the press rolls 28 causing extrusion of the processing solution provided in the monosheet 6, to effect development of a positive image on the monosheet 6, in a conventionally known manner. As the monosheet 6 passes through the slits 10, 13, it presses the forward end of the lightproof strip 5 rearwards against the bevelled surface of the front edge of the end wall 2. After the monosheet 6 has been withdrawn completely from the cassette CA, the forward end of the strip 5 moves forward again to contact the outer case front wall 1a, and the remining monosheets 6 in the cassette CA are moved forwards by the plate spring 7, whereby the next foremost monosheet 6 is brought into a position for exposure and subsequent removal, in the same manner as the monosheet 6'. When the remaining monosheets 6 are thus moved forwards, the inner frame is not, of course, moved, since it is already in close contact with the outer case front wall 1a. The same process is repeated upon exposure of each subsequent monosheet 6.

If it is required to load a new cassette CA', when there are still monosheets 6 remaining in the cassette CA already loaded in the camera C, the protective board 3 is re-inserted in the extraction outlet of the camera C, and the friction rollers 35 and press rolls 28 are actuated by a suitable means provided on the camera C, and are rotated in directions which are the reverse of the rotation directions for removal of the board 3, or a monosheet 6, from the cassette CA and camera C. At the same time, the levers 71, associated with the rollers 35, are pivoted into positions in which the push projections thereof pass through the openings 9 in the outer case front wall 1a, contact the front wall 4a of the inner frame 4, and push the leading end portions of the frame 4 and remaining monosheets 6 slightly rearwards, thus permitting unhindered entry of the board 3 into the cassette, as indicated in FIG. 22(c). Still referring to FIG. 22(c), as the board 3 is brought to the slit 10, the leading end thereof, that is, the end thereof first entering the cassette CA, contacts the outer side of the lightproof strip 5. As illustrated in FIG. 22(d), as the board 3 continues to be moved into the cassette CA by the rolls 28, the board 3 pushes the forward end portion of the strip 5 into the cassette CA. Also, when the leading end of the board 3 enters the cassette CA to a position between the frame front wall 4a and outer case front wall 1a, the levers 71 are again moved to positions in which the push projections thereof no longer contact the frame front wall 4a whereby the frame 4 and remaining monosheets 6 are moved forwards by the spring 7, and the front side of the board 3 is brought into contact with the rollers 35 extending through the openings 9. The board 3 continues to be drawn into the cassette CA by the rollers 35 and rolls 28. When the rear end of the board 3 moves out of contact with the rolls 28, the board 3 continues to be moved and is drawn completely into the cassette CA by the rollers 35, rotation of the rollers 35 and rolls 28 being stopped after complete re-insertion of the board 3. As indicated in FIG. 22(e), the protective board 3 and lightproof sheet 5 are now in the original configuration, in which the board 3 lies between the front walls 1a, 4a of the case 1 and frame 4, and protects the remaining monosheets 6 from exposure to light through the large openings 8, 11, or small openings 9, 12, and the forwards end of the lightproof strip 5 is curved inwards with respect to the cassette CA, and is held between the board 3 and inner frame front wall 4a, the strip 5 thus preventing entry of light through the slits 10, 13. The cassette CA may therefore be unloaded from the camera C without there being any risk of exposure of the remaining monosheets 6, which are thus available for subsequent use. In another embodiment of the invention shown in FIG. 23, a protective board 3 is initially provided not between the frame 4 and outer case front wall 1a, but inside the frame 4, in front of the foremost monosheet 6. In this case, the board 3 is drawn out of the cassette CA through the slits 12, 9. If, however, the protective board 3 is to be re-inserted into the cassette CA, for the purposes of temporary unloading of the cassette CA, the board 3 is re-inserted between the frame front wall 4a and outer case front wall 1a, in the same manner as described in reference to the above embodiment.

As illustrated in FIG. 24, instead of a frame 4 with front, side, and end walls, there may be employed a frame 4', constituted by a flat board, having a suitable opening to permit exposure of monosheets 6. In this case, the rear edge of the lightproof strip 5 is affixed to the inside of the outer case end wall 2. In any of the embodiments shown in FIGS. 1 through 24, the strip 5 may, of course to affixed to the outer side of the case end wall 2, as indicated in FIG. 26.

In another embodiment of the invention instead of a separate lightproof strip and inner frame, there is provided an inner frame 4'' to which there are attached end walls 2 made of flexible, lightproof material, as shown in FIG. 25. Alternatively entry of light into the cassette through the slits 10, 13 may be prevented by providing the slits 10, 13 with pile surfaces 5', as shown in FIG. 27.

In the embodiment of FIGS. 29 to 32, there is formed on one side of the board 3 a ridge 72, which extends across the width of the board 3, and is close to one end 3a thereof. The board end 3a is the leading end, that is, the end of the board 3 which lies adjacent to the exit slit 10 of the cassette CA. The height of the rib 72 is equal to or slightly less than the width of the lightproof strip 5. As shown most clearly in FIG. 31(a), when the protective board 3 lies within the cassette CA, the forward end of the lightproof strip 5 is curved inwards with respect to the cassette CA, is held between the front wall of the inner frame 4 and the rear side of the protective board 3, the strip 5 thus sealing the exit slit 13, and the forward edge of the strip 5 is contacted by the rib 72 of the board 3. As indicated in FIG. 31(b), when the board 3 is removed from the cassette CA, through the slit 10, in order to uncover the exposure opening 8 of the cassette CA, the rib 72 pushes the forward edge of the strip 5, and the strip 5 is pushed outwards with respect to the cassette CA, whereby monosheets 6 may be subsequently removed without hindrance through the slits 13, 10.

Reference is now had to FIG. 32, which illustrates the action of removal and re-insertion of the protective board 3 from and into the cassette CA. In FIG. 32(a), when the cassette CA is loaded in the camera C, the monosheet exit slit 13 thereof lies in line with an extraction outlet 27 formed in the camera C. In the extraction outlet 27 there is provided a pair of processing rolls 28, which effect withdrawal of exposed monosheets 6 and extrusion of chemical solution from the monosheets 6 to effect development of images thereon, in a known manner. In the camera C there is also formed an inlet passage 73, which is formed at an angle to the extraction outlet 27, leads from the outside of the camera C to the cassette exit slit 13, and permits re-insertion of the protective board 3. The front of the protective board 3 is contacted through the small openings 9 of the outer case 1 by friction rollers 35. Push levers 71 provided in the camera C may also pass through the openings 9, but are normally held out of contact with the cassette CA.

After initial loading of the cassette CA, a blank shot is taken, whereupon the friction rollers 35 and processing rolls 28 are rotated and the board 3 is drawn out of the cassette CA and of the camera C, through the slit 10 and outlet 27 (FIG. 32(b)). At this time the lightproof strip 5 is pushed outwards, as described earlier. After complete removal of the board 3, the spring plate 7 pushes the monosheets 6 and frame 4 forwards a distance equal to the thickness of the board 3, thus bringing the foremost monosheet 6 into a correct position for exposure, and the forward end of the strip 5 is pressed against the rear of the front wall of the outer case 1, thus providing extra protection against entry of light into the cassette CA through the slit 10, but not preventing removal of monosheets 6. Upon actuation of the camera shutter button to expose the foremost monosheet 6, the friction rollers 35 contacting the foremost monosheet 6 through the outer case openings 9 and corresponding openings in the front wall of the inner frame are rotated, and draw the monosheet 6 out from the cassette CA, through the extraction outlet 27 to the processing rolls 28, which, while effecting extrusion of the processing solution associated with the monosheet 6, direct the monosheet 6 out of the camera C, as indicated in FIG. 32(c). The spring plate 7 pushes the monosheets 6 forwards and brings the next monosheet 6 into the foremost position for exposure and subsequent removal, and so on for succeeding monosheets 6.

If it is required to temporarily unload the cassette CA before all the monosheets 6 therein have been exposed, the friction rollers 35 are rotated in a direction for feed into the cassette CA (clockwise in the drawing)., by actuation of a switch or similar means provided on the camera C. At the same time this causes the push levers 71 to be moved through the case front openings 9 and push the leading ends of the frame 4 and monosheets 6 slightly rearwards, to permit unhindered insertion of the protective board 3 between the front walls of the inner frame 4 and outer case 1 (FIG. 32(d)). The protective board 3 is inserted through the inlet passage 73 (FIG. 32 (e)). When the board 3 passes through the cassette exit slit 13, the lightproof strip 5 is again pushed inwards with respect to the cassette CA, and the push lever 71 is moved out of contact with the cassette CA, whereby the frame 4 is moved forwards by the force of the plate 7, and presses the board 3 into contact with the friction rollers 35. The friction rollers 35 are rotated until the protective board 3 is drawn completely into the cassette CA, and then stopped (FIG. 32(f)). The lightproof strip 5 may be pushed to its original configuration by the main portion of the board 3. However, even if the main portion of the board 3 is not effective in moving the strip 5, contact between the forward end of the strip 5 and the rib 72 of the board 3 moving into the cassette CA ensures that the strip 5 is moved to a configuration in which it is curved inwards with respect to the cassette CA, and prevents entry of light through the slits 10, 13. In other words, the protective board 3 and lightproof strip 5 are now in the same positions as prior to loading, and the cassette CA may be unloaded from the camera C without there being any risk of exposure of the remaining monosheets 6.

As is clear from the above description, the present invention provides a monosheet film cassette comprising a removable and re-insertable protective board, which protects monosheets from exposure, but without contacting or damaging the monosheets, whereby the cassette of the invention may be unloaded any number of times from a camera, without risk of exposure of remaining monosheets.

Also, the present invention provides a film cassette which is simple in construction, and provides the advantages that forward pressure on monosheets in the cassette is applied evenly, whereby there is no distortion of monosheets, and that protection of monosheets is provided by a strong outer case and by a strong protective board, which covers openings in the outer case, but which does not directly contact monosheets in the cassette, whereby there is no damage caused to monosheets by a photographer inadvertently pressing the protective board, or by insertion of the board into the cassette. In addition, a protective lightproof board according to the invention ensures protection of monosheets from exposure to light through front openings of a cassette, and also ensures correct positioning of a means for preventing entry of light through a monosheet removal exit, both prior to loading, and during temporary unloading of the cassette into and from an auto-process camera.

Although the present invention has been fully described by way of the preferred embodiments thereof with reference to the accompanying drawings, it is to be noted that various changes and modifications are apparent to those skilled in the art. Therefore, unless otherwise such changes and modifications depart from the ture scope of the present invention, they should be construed as included therein.

What is claimed is:

1. A film cassette containing a plurality of film monosheets comprising a lightproof outer case, said case forming a front opening through which monosheets may be exposed, and an exit opening through which exposed monosheets may be removed, a spring means urging said monosheets toward said front opening, a protective lightproof board. located in said cassette adjacent said front opening, a strip made of flexible lightproof material with a length equal to that of said exit opening and a width greater than that of said exit opening, one edge of which is attached to the interior of said case adjacent said exit opening and the free end of which covers said monosheet exit opening and is bent by pushing of said board to open said monosheet exit, whereby monosheets in said cassette may be protected from exposure to light through said front opening said lightproof board being removable from and insertable into said cassette through said monosheet exit.

2. A film cassette as defined in claim 1, wherein: said lightproof board has a projection portion adjacent one end thereof which contacts the free end portion of said flexible lightproof means upon insertion or removal of said board into or from said cassette, thereby moving said flexible lightproof means to close or open said monosheet exit.

3. A film cassette containing a plurality of film monosheets, comprising a lightproof outer case, an inner frame being contained within said outer case, said monosheets retained in said frame, said case and said frame each having a front opening through which said monosheets may be exposed and an exit through which exposed monosheets may be removed, a spring means urging said monosheets toward said front openings, flexible lightproof means attached to said inner frame adjacent said exit to close or open said exit, and a protective lightproof board, located in said cassette adjacent said front opening between said case and said frame, whereby said monosheets in said cassette may be protected from exposure to light through said opening, said lightproof board being insertable into and removable from said cassette through said exit.

4. A film cassette as defined in claim 3, wherein said flexible lightproof means comprises a strip of flexible light proof material with a length equal to that of said case opening and a width greater than that of said case opening, one edge of which is attached to the rear of said frame, and the free end of which covers said case monosheet exit and is bent by pushing of said board to open said case monosheet exit.

5. A film cassette as defined in claim 3, wherein said case and frame provide respectively an opening portion through which reversible drive means provided in a camera may contact the forward most monosheet or said board in said cassette to remove said monosheet or remove or re-insert said board.

6. A film cassette as defined in claim 3, wherein said frame further comprises forwardly projecting side wall portions which contact the rear of said case front wall, whereby said case and frame front walls are held apart, said lightproof board being located between said case and frame front walls and laterally between said frame forwardly projecting side wall portions, and said lightproof board is insertable into or removeable from said cassette.

7. A film cassette as defined in claim 3, wherein said case further comprises a pair of grooves formed in the inside of laterally opposite case side walls, in which sides of said inner frame are supported, said lightproof board being positioned between said case and said frame.

8. A film cassette as defined in claim 3, wherein an entrance is provided in the case of the end opposite the monosheet exit, to allow the re-insertion of said lightproof board between said case and said frame.

* * * * *